US012625687B1

(12) United States Patent
Li et al.

(10) Patent No.: US 12,625,687 B1
(45) Date of Patent: May 12, 2026

(54) PARALLEL EXECUTION COMPONENT INITIALIZATION USING STATIC DEPENDENCY ANALYSIS

(71) Applicant: Zoom Video Communications, Inc., San Jose, CA (US)

(72) Inventors: Zhuo Li, Hangzhou (CN); Xiaohuan Pan, Jiaxing (CN); Jingjin Xie, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 215 days.

(21) Appl. No.: 18/373,395

(22) Filed: Sep. 27, 2023

(51) Int. Cl.
G06F 8/41 (2018.01)

(52) U.S. Cl.
CPC .................................... G06F 8/433 (2013.01)

(58) Field of Classification Search
CPC ....................................................... G06F 8/433
See application file for complete search history.

(56) References Cited

U.S. PATENT DOCUMENTS

| | | | | |
|---|---|---|---|---|
| 8,347,272 B2 * | 1/2013 | Sugawara | ................. | G06F 8/75 717/133 |
| 8,612,957 B2 * | 12/2013 | Guo | ........................ | G06F 8/445 717/161 |
| 9,038,033 B1 * | 5/2015 | Hidayat | .................... | G06F 8/33 717/129 |

| | | | | |
|---|---|---|---|---|
| 9,557,975 B2 * | 1/2017 | Angerer | ................ | G06F 9/4552 |
| 9,569,281 B1 * | 2/2017 | Krauss | ........................ | G06F 9/52 |
| 10,019,245 B2 * | 7/2018 | Egorov | ..................... | G06F 8/54 |

(Continued)

FOREIGN PATENT DOCUMENTS

| | | | | | |
|---|---|---|---|---|---|
| CN | 112306471 A | * | 2/2021 | ........... | G06F 9/4881 |
| CN | 115373696 A | * | 11/2022 | .............. | G06F 8/60 |

(Continued)

OTHER PUBLICATIONS

CN-112306471-A—English translation text.*

(Continued)

*Primary Examiner* — Francisco J Aponte
(74) *Attorney, Agent, or Firm* — Kilpatrick Townsend & Stockton LLP

(57) ABSTRACT

Techniques for parallel execution component initialization using static dependency analysis are disclosed. In an example method, a computing device receives a set of program code comprising execution components. The computing device generates a dependency graph based on a static analysis and determines a subset of the execution components that do not depend on any other execution component of the execution components. The computing device configures an initialization thread pool to initialize in parallel a plurality of the subset of the execution components. Responsive to a first execution component of the subset of the execution components completing initialization, the computing device determines a second execution component that depends on the first execution component and does not depend on any other uninitialized execution components of the execution components or any of the subset of the execution components initializing. The computing device configures the thread pool to initialize the second execution component.

20 Claims, 7 Drawing Sheets

(56)         References Cited

U.S. PATENT DOCUMENTS

| 10,235,276 | B2 * | 3/2019 | Guan | G06F 11/3672 |
| 10,650,482 | B1 * | 5/2020 | Yu | G06T 17/00 |
| 11,200,032 | B2 * | 12/2021 | Bebee | G06F 8/311 |
| 11,436,055 | B2 * | 9/2022 | Banerjee | G06F 9/5066 |
| 11,714,616 | B2 * | 8/2023 | Goodwin | G06F 8/433 |
| | | | | 717/144 |
| 11,934,832 | B2 * | 3/2024 | Gao | G06F 9/3889 |
| 12,340,198 | B2 * | 6/2025 | Hykes | G06F 8/61 |
| 2015/0309913 | A1 * | 10/2015 | Bates | G06F 8/436 |
| | | | | 717/132 |
| 2017/0147475 | A1 * | 5/2017 | Abadi | G06F 8/433 |
| 2018/0276040 | A1 * | 9/2018 | Hosmani | G06F 9/4843 |
| 2018/0293058 | A1 * | 10/2018 | Bierman | G06F 8/436 |
| 2018/0364994 | A1 * | 12/2018 | Toper | G06F 11/3616 |
| 2019/0042216 | A1 * | 2/2019 | Zhang | G06F 8/433 |
| 2019/0227815 | A1 * | 7/2019 | Ames | G06F 8/61 |
| 2023/0153112 | A1 * | 5/2023 | Stripf | G06F 9/3005 |
| | | | | 712/216 |

FOREIGN PATENT DOCUMENTS

| CN | 119631056 A * | 3/2025 | G06F 9/5083 |
| WO | WO-2023224549 A2 * | 11/2023 | G06F 9/4881 |

OTHER PUBLICATIONS

Wimmer, Christian, et al. "Initialize once, start fast: application initialization at build time." Proceedings of the ACM on Programming Languages 3.OOPSLA (2019).*
Parallel Bean Initialization During Setup [SPR-8767] #13410, Tomasz Nurkiewicz, Spring Projects, Spring Framework, 14 pages.
Bean Overview, Spring Framework, Core Technologies, The IoC Container, 10 pages.

* cited by examiner

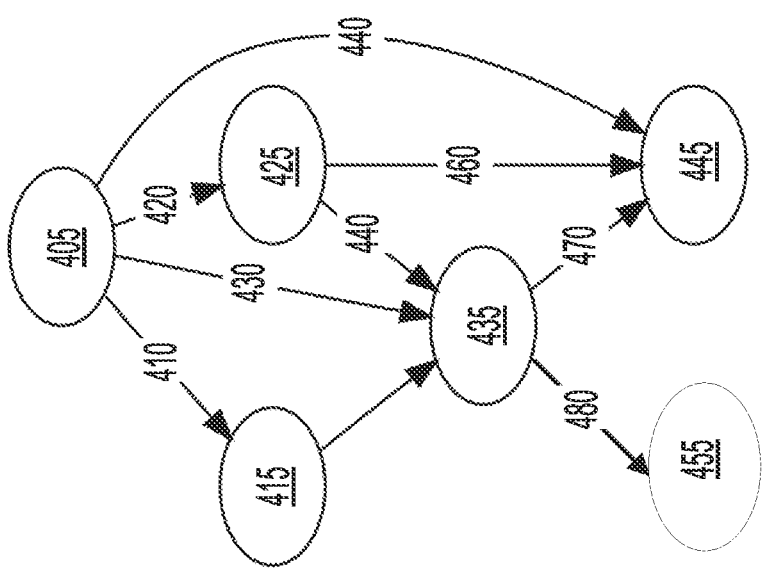
FIG. 4

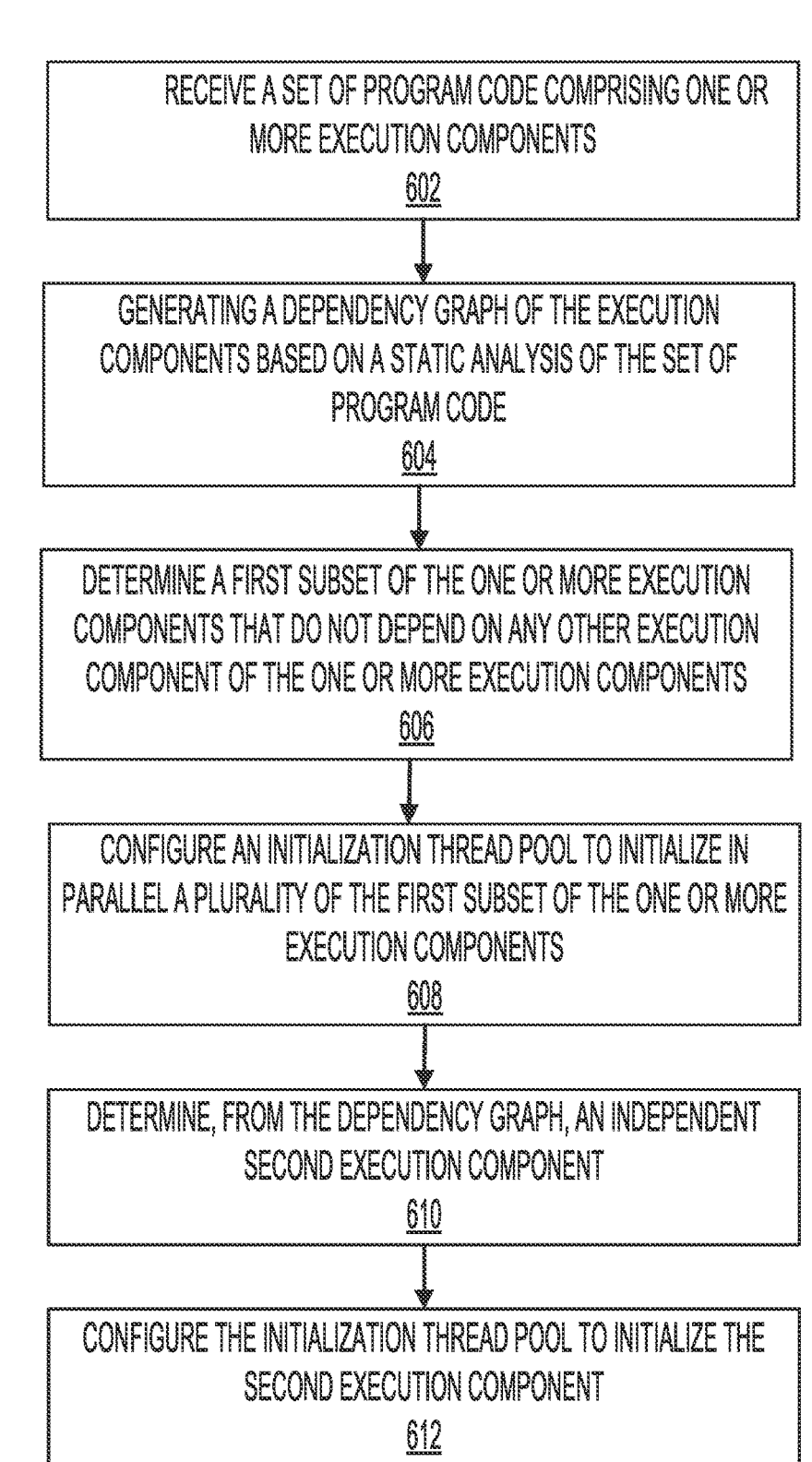

600

RECEIVE A SET OF PROGRAM CODE COMPRISING ONE OR
MORE EXECUTION COMPONENTS
602

GENERATING A DEPENDENCY GRAPH OF THE EXECUTION
COMPONENTS BASED ON A STATIC ANALYSIS OF THE SET OF
PROGRAM CODE
604

DETERMINE A FIRST SUBSET OF THE ONE OR MORE EXECUTION
COMPONENTS THAT DO NOT DEPEND ON ANY OTHER EXECUTION
COMPONENT OF THE ONE OR MORE EXECUTION COMPONENTS
606

CONFIGURE AN INITIALIZATION THREAD POOL TO INITIALIZE IN
PARALLEL A PLURALITY OF THE FIRST SUBSET OF THE ONE OR MORE
EXECUTION COMPONENTS
608

DETERMINE, FROM THE DEPENDENCY GRAPH, AN INDEPENDENT
SECOND EXECUTION COMPONENT
610

CONFIGURE THE INITIALIZATION THREAD POOL TO INITIALIZE THE
SECOND EXECUTION COMPONENT
612

FIG. 6

PARALLEL EXECUTION COMPONENT INITIALIZATION USING STATIC DEPENDENCY ANALYSIS

FIELD

The present application generally relates to software engineering, and more particularly relates to parallel execution component initialization using static dependency analysis.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 is an illustration of a dependency graph that may be used during parallel component initialization using static dependency analysis, according to some aspects of the present disclosure.

FIG. 6 shows a flowchart of an example method implementing parallel component initialization using static dependency analysis, according to some aspects of the present disclosure.

DETAILED DESCRIPTION

Figure 1:
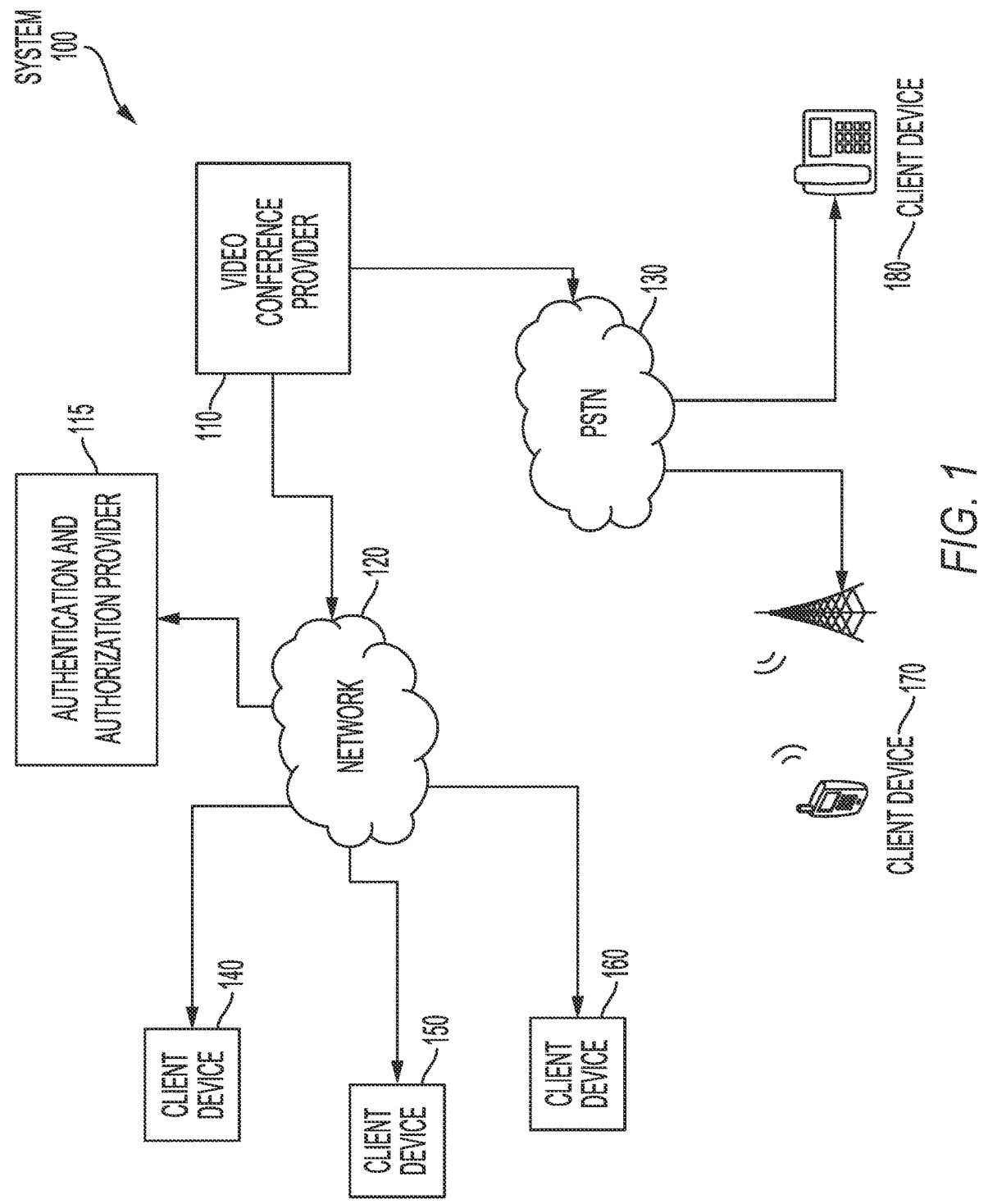
FIG. 1 shows an example system that provides videoconferencing functionality to various client devices.

Examples are described herein in the context of techniques for parallel execution component initialization using static dependency analysis. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing continues to both supplement and complement personal and enterprise communications with increasing frequency and importance. Indeed, it is by now a routine part of communicating with others for most people, both in the home and the workplace. One reason for the proliferation of remote video communications is the reliability of the platforms provided by some video conferencing platforms.

A cornerstone of reliability for modern, complex cloud-based computing systems is fast recovery from inevitable system faults. For example, a typical deployment scenario involves modular, containerized software, with numerous instances of various components running, scaling vertically and horizontally according to demand. Some frequency of system faults is inevitable due to network failures, undetected program bugs, disk and memory space limits, and so on. Operational planning must assume that software modules will need to be restarted from time to time. Thus, in production, the time for a particular software module to start up is of particular importance when planning for fault or disaster recovery. Likewise, during development, long startup times may cause bottlenecks during development and testing cycles.

Nevertheless, in some cases, software startup and initialization can take an undesirably long amount of time. Consider the typical example of an application framework (e.g., Spring, Django, Ruby on Rails, Express.js, etc.) that provides application programming interfaces (APIs) for rapid software development of web applications. Typically, developers need only author execution components (e.g., JavaBeans, Spring beans, etc.) that encapsulate business logic and can otherwise rely on modules provided by the application framework for common, repetitive tasks, middleware, or low-level interfaces. Upon startup of the application framework, the execution components may be automatically started and initialized by the application framework. In some existing systems, the execution components may be initialized and started serially (e.g., one at a time according to a particular ordering). Serial initialization and startup of execution components may result in needlessly long startup times, particularly when hardware or virtualized resources for parallel execution lie dormant.

Example techniques for parallel execution component initialization using static dependency analysis are provided herein for, among other things, improving application startup times. The following non-limiting example method is provided to introduce certain embodiments. In the example method, a computing device receives a set of program code including one or more execution components. For example, in a typical scenario, an application framework like Spring provides various core dependencies and application developers need only author execution components that extend the core functionality of the application framework using APIs provided by the application framework.

The set of program code may thus be a collection of source code files, in which each or some subset of the source code files constitute an execution component. An execution component may be, for instance, a Java source code file and an extensible markup language (XML) configuration file that are, together, a Spring bean or JavaBean. In some examples, the set of program code may be compiled source code. For instance, the set of program code may be a collection of files containing Java bytecode, configuration files, compiled source code files from other languages, graphical or audio assets, and so on. In some examples, the set of program code may be received by way of an automated build tool configured to use a particular extension for parallel initialization.

The computing device then executes a static analysis of the set of program code. Static analysis includes operations on program code that output information relevant to the improved runtime operation of the program code. For example, a standalone static analysis tool can receive as input the set of program code to perform various static analyses such as control flow analysis, type checking, potential overflow detection, among many others. The static analysis tool can, for instance, generate a dependency graph—sometimes called a call graph—of the execution components.

The computing device determines, from the dependency graph, a first subset of the one or more execution components that do not depend on any other execution component of the one or more execution components. In this context, a dependency may refer to the inclusion of an element from another execution component that is required at runtime. For instance, if a first execution component is a Spring bean based on a Java class, the Spring bean may include or use a method or attribute exposed by second execution component. The first execution component depends on the second execution component. The computing device may thus identify a subset of "top-level" execution components that can start up independently of any other execution component, even the other execution components in the first subset.

Based on the identified first subset of execution components, the computing device configures an initialization thread pool to initialize some plurality of the first subset of the one or more execution components in parallel. For example, a particular system executing an application framework and a collection of execution components may have a thread pool for initializing the application available that includes 5 threads based on hardware and resource constraints, current load, and so on. If the first subset of execution components includes 10 components, then the computing device may determine a plurality of execution components of the first subset—5 in this case—to start up in parallel.

In some examples, the computing device may go on to start the remainder of the execution components in the first subset as initialization completes and threads become available. However, responsive to a first execution component of the first subset of the one or more execution components completing initialization, the computing device may also determine, from the dependency graph, a second execution component that depends on the first execution component and does not depend on any other uninitialized execution components of the one or more execution components or any of the first subset of the one or more execution components that are currently initializing. The computing device may thus select an execution component that is dependent on an initialized execution component, but not dependent on any of the execution components still initializing or any of the other execution components that have not begun initializing. The computing device then configures the initialization thread pool to initialize the second execution component. In some examples, the computing device follows a similar process to initialize all of the execution components, using available threads and the dependency graph to improve parallelization.

The innovations of the present disclosure provide significant improvements in the fields of software engineering and application development using parallelized resources. Application developers using existing facilities provided by application frameworks may be limited in their ability to improve critical application startup times. For example, some application frameworks may require serial initialization of execution components. Using techniques for parallel execution component initialization using static dependency analysis, application developers can fully utilize previously dormant multithreaded resources to optimize startup time. Improving the use of dormant threads results in a more efficient use of purchased server or cloud resources and thus potentially includes cost savings.

This advantage can be obtained through an extension added to commonly used automated build tools, equating to a negligible investment of time or effort to obtain parallelized initialization. The dependency graph generated can be reused, further decreasing build and startup time on subsequent restarts. Moreover, the dependency graph can be manually updated or improved to further improve startup times.

In addition to improving startup times, parallel initialization results in additional improvements to the fields of software engineering and application development using parallelized resources. The dependency graph itself can be used to analyze and debug applications built using the application framework. Parallel initialization of execution components that should not have dependencies may help to expose difficult-to-find program bugs like scheduling conflicts or race conditions. The routine use of static analysis tools comes with many additional benefits that may be provided in addition to the dependency graph, like static code analysis that may expose bugs before runtime.

These illustrative examples are given to introduce the reader to the general subject matter discussed herein and the disclosure is not limited to these examples. The following sections describe various additional non-limiting of techniques for parallel component initialization using static dependency analysis.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
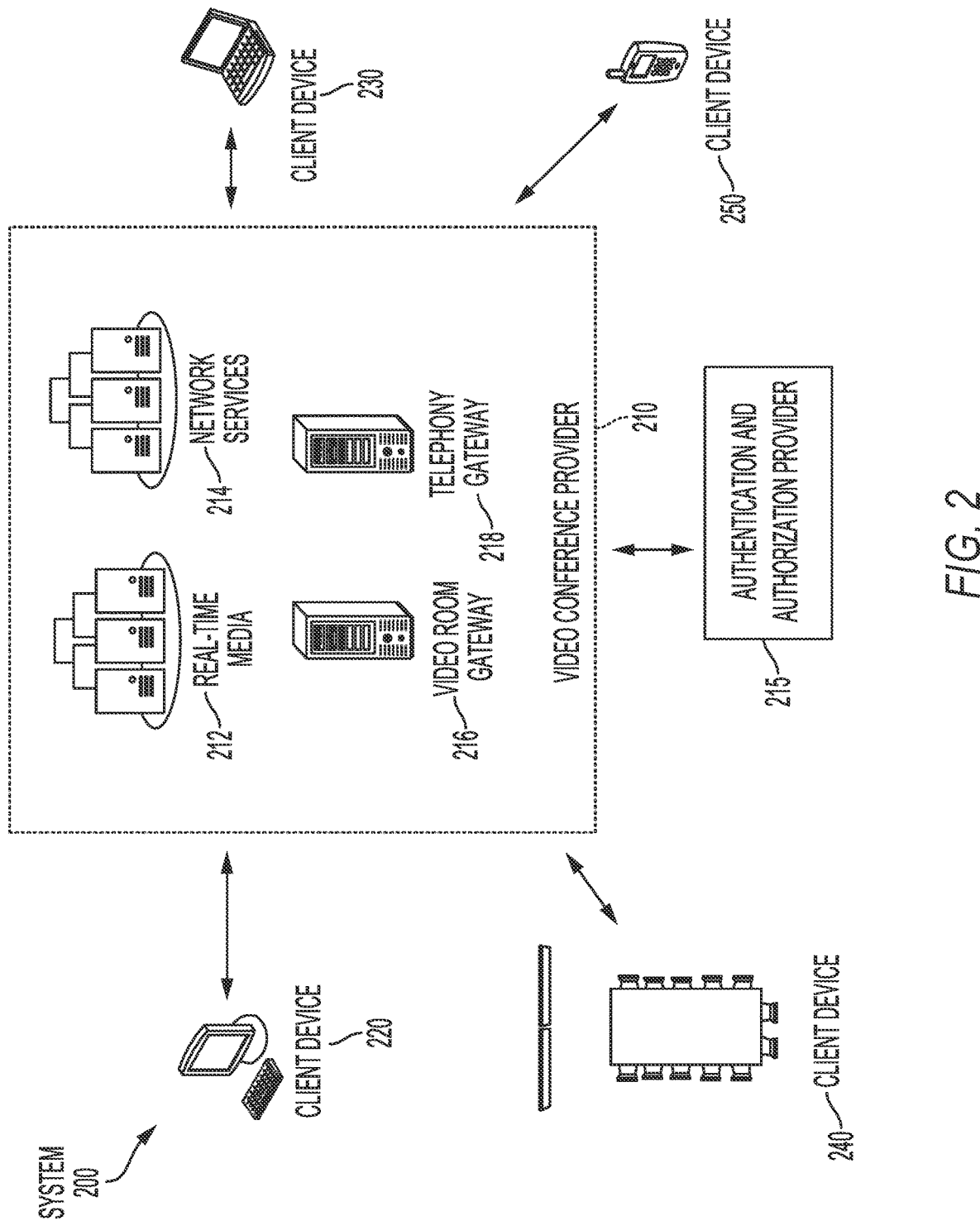
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multifrequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
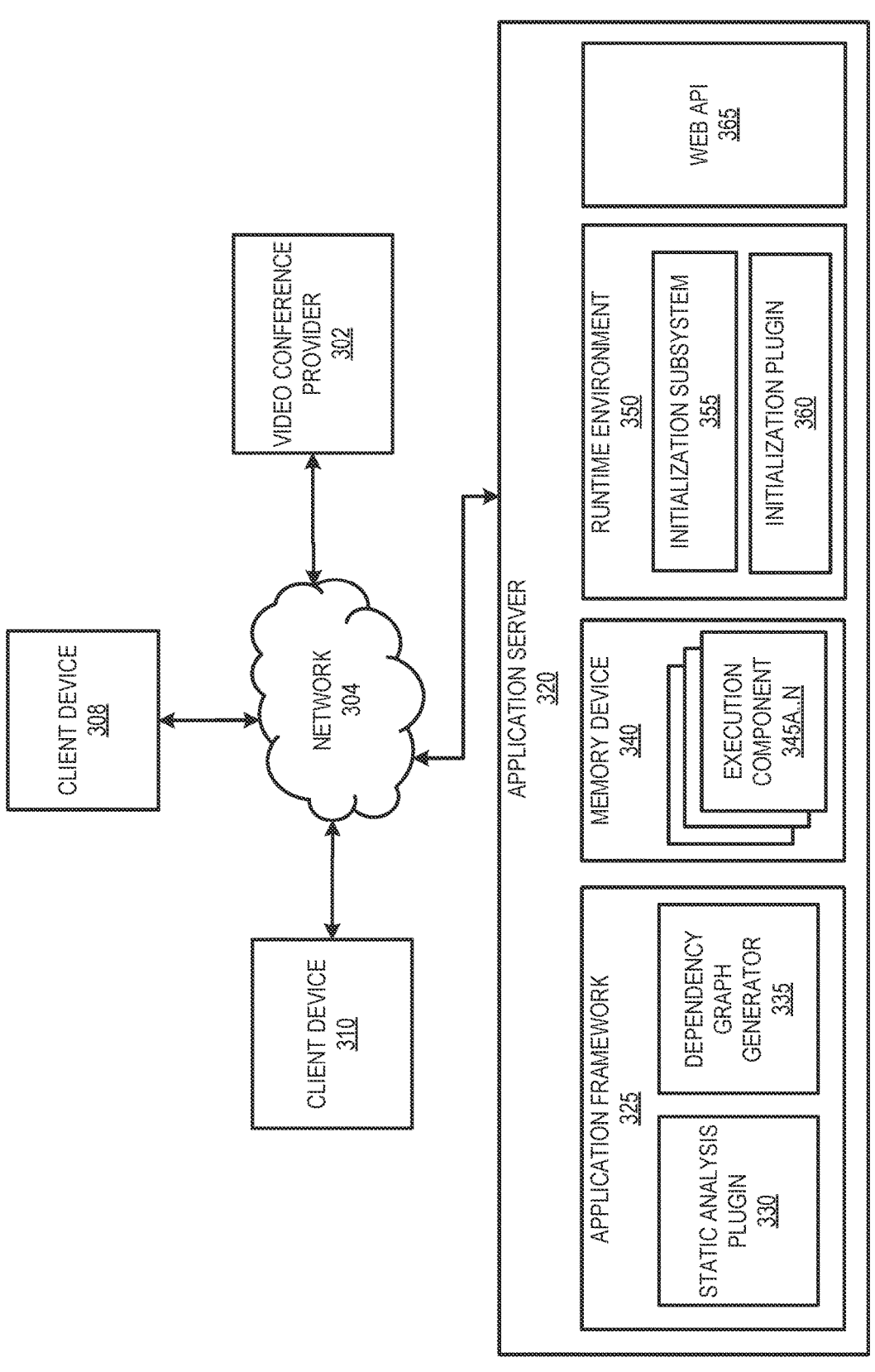
FIG. 3 shows an example of a system for parallel component initialization using static dependency analysis, according to some aspects of the present disclosure.

Referring now to FIG. 3, FIG. 3 shows an example of a system 300 for parallel component initialization using static dependency analysis, according to some aspects of the present disclosure. One or more client devices 308, 310 are communicatively coupled with a video conference provider 302. For example, the client devices 308, 310 may be coupled to the video conference provider over a network 304. The network 304 can include public networks, private networks, the Internet, or any other suitable combination of networked devices.

In example system 300, the video conference provider 302 hosts a video conference with one or more participating client devices 308, 310. For example, a plurality of client devices 308, 310 may join a video conference together. A video conference may include the video and audio streams of each participant being sent from each respective client device 308, 310 to the video conference provider 302 and then to the client devices 310, 308 of the remaining participants. The example system 300 depicts two client devices 308, 310 that may be participants in a video conference.

The example system 300 includes an application server 320 that may be a component of the video conference provider 302 or a standalone local or remote server. For instance, the application server 320 may host a web application programming interface (API) 365 that is used for the provisioning of video conferencing services to client devices 308, 310. Such a web API 365 may be used internally or externally to the video conference provider 302. An internal web API 365 may be used for communication among video conference provider 302 components, whereas an external (e.g., public-facing) web API may expose video conference provider 302 functionality to users or application developers. In either case, maximizing the availability of such web APIs can be a significant factor in the provisioning of reliable video conferencing services. The web API 365 is, however, just an example of a video conference provider 302 component that may benefit from parallel component initialization using static dependency analysis. The application framework 325, as discussed below, can be used for the generation of other kinds of applications, such as desktop applications, mobile applications, embedded systems, or cloud-based applications.

Application server 320 may include application framework 325 for the development of applications for use in the video conference provider 302 or otherwise for the provisioning of video conferencing services. The application may, for example, include one or more components of a video conferencing platform such as video conference provider 302. In a typical embodiment, the application framework 325 includes various APIs, tools, documentation, and so on, for the development of applications for execution in the runtime environment 350. Note that while the application framework 325 is shown in FIG. 3 as a component of the application server 320, it may also be used in a separate development environment. Popular example application frameworks 325 include Spring, Django, Ruby on Rails, Express.js, Angular, React, Vue.js, Electron, ASP.NET Core, and Play, among many others.

During the development of applications using application framework 325, application developers may generate a number of execution components 345A . . . N for execution alongside the core components provided by the application framework 325. For example, the application framework 325 may provide core components and boilerplate program code for executing a web API 365 including web server interfaces, database interfaces, request and response processing interfaces, and so on. The application developer then authors the execution components 345A . . . N that contain the program code specific to a particular context or application. Some examples of execution components 345A . . . N that are used in association with certain popular application frameworks 325 include JavaBeans, Spring Beans, EJBs (Enterprise JavaBeans), .NET Components, Component Object Model (COM) objects, Models, Views, and Controllers for Ruby on Rails, and so on.

Execution components 345A . . . N may be generated as source code along with configuration files, among other components. For example, the execution components 345A . . . N when used in concert with an application framework 325 such as the Spring Framework, may be authored as Java classes (e.g., text files with a .java file extension) along with accompanying XML configuration files for Spring context. Other examples include Python scripts with associated YAML files for environment settings, C#classes with related JSON configuration files for .NET applications, or Ruby on Rails models with corresponding database.yml files for database connections. Many other combinations of source code, configuration, and other related files may be used with various application frameworks 325 for the creation of execution components 345A . . . N. Types may be used independently or in combination according to the parameters of the application framework 325.

The execution components 345A . . . N may be processed, compiled, or linked in such a way that they can be executed by the application server. In a typical configuration, executable program code is included in a memory device 340 in preparation for execution in a runtime environment 350. For instance, the executable execution components 345A . . . N may be loaded from a persistent storage medium such as a hard drive or cloud storage location into an ephemeral memory device 340 such as the RAM of the application server 320. The runtime environment 350 can then access the memory device 340 to execute the execution components 345A . . . N.

The application framework 325 may provide the runtime environment 350 for the execution of the execution components 345A . . . N. For example, the Spring application framework includes a number of core components that are executed before the execution components 345A . . . N to prepare the runtime environment 350. The runtime environment 350 thus provided by the Spring framework includes the core components and interfaces as described above that may be used by the execution components 345A . . . N.

Upon the availability of the runtime environment 350, an initialization subsystem 355 can be used to initialize and execute the execution components 345A . . . N. Initialization of the execution components 345A . . . N may include operations such as instantiation of classes in the memory device 340, creation of ephemeral objects, such as static collections (e.g., arrays or hashmaps), or the creation of connections to external services, such as databases. In some examples, these operations may take a significant amount of time (e.g., several minutes). In some initialization subsystem 355 implementations, the execution components 345A . . . N are initialized serially. This means that a first execution component of the execution components 345A . . . N is selected for initialization, followed another, and so on. In cases where the initialization operations take a significant period of time, the initialization process may cause application startup time to exceed operational design parameters. For example, in some highly robust, scalable systems, if an execution component needs to be restarted (e.g., following a crash), startup should be fast enough to prevent any service interruption to users. In some cases, serial initialization of execution components 345A . . . N is prohibitively slow. Thus, parallel component initialization using static dependency analysis can be used to initialize execution components 345A . . . N in parallel to significantly improve startup time.

Application development with application framework 325 may be done in concert with a build automation tool. Build automation tools are software components that can be used to automate the complex, repetitive tasks that may be routinely performed during software development. For example, popular build automation tools used during Java development and during application development using, for instance, the Spring Framework, include tools such as Maven or Gradle. Such build automation tools may include extension frameworks or plugin development APIs for adding to or extending the capabilities of the tools.

For example, the application framework 325 may be used in conjunction with a static analysis plugin 330. The static analysis plugin 330 may evaluate source code without executing it to identify potential errors, vulnerabilities, code quality issues, or to perform dependency analysis. Dependency analysis refers generally to the process of identifying interrelationships between software components. For example, dependency analysis may operate by scanning the source code and identifying references or imports between modules or components. In cases of dynamic languages or runtime-loaded components, where dependency analysis based on source code along may not be possible, dependency analysis may also employ heuristic methods or runtime data.

In the context of execution components 345A . . . N, a dependency includes execution component pairs for which there is an element defined in a provider execution component and an interface to the element used in a dependent execution component. For example, the provider execution component may be a JavaBean that includes a connection to a database. The dependent execution component may include a reference to the provider execution component and may also use the connection to the database included in the provider component. Both the reference to the provider component and the connection to the database are examples of dependencies among a pair of execution components.

The static analysis plugin 330 may include a dependency graph generator 335. The dependency graph generator 335 can construct a graph to represent the results of the dependency analysis where nodes represent individual modules and edges represent dependencies. In some cases, the graph may be a directed acyclic graph (DAG). DAGs are a natural fit for program code that lack circular dependencies, which are bugs that can lead to initialization failures or deadlocks. Other types of graphs used in dependency analysis may include tree graphs, undirected graphs bipartite graphs, weighted graphs, and so on.

The application framework 325 may provide an extension or plugin API similar to the build automation tool. The runtime environment 350 may thus include an initialization plugin 360 that can be used for parallel component initialization using static dependency analysis. The initialization plugin 360 can receive the dependency graph generated by the dependency graph generator 335 to implement parallel execution component initialization. In some examples, the static analysis plugin 330 and the initialization plugin 360 can be integrated with and configured using the build automation tool.

The initialization plugin 360 can determine, using the dependency graph, a subset of the execution components 345A . . . N that do not depend on any other execution component of the execution components 345A . . . N. These "topline" components can be initialized first, in any order. They can also, therefore, be initialized in parallel, provided ample system resources are available. The initialization plugin 360 can thereby configure a thread pool to initialize the subset of the execution components 345A . . . N identified based on the dependency graph.

The thread pool may be a manually created group of threads, a predefined thread pool, an executor service, or other comparable abstraction for the initiation of parallel processes. Such abstractions may be used to automate the determination of optimized system resources for parallel initialization of execution components 345A . . . N, but in some examples, the thread pool is manually configured using the configuration facilities of the initialization plugin 360.

At application startup, the initialization plugin 360 can initiate parallel initialization of the subset of the execution components 345A . . . N in accordance with the generated dependency graph. Once the initialization of an execution component 345A . . . N completes, the execution component 345A . . . N to initialize next is determined from the dependency graph. The next execution component 345A . . . N is one which may depend on the execution component 345A . . . N on the execution component 345A . . . N that just completed its initialization and does not depend on any other uninitialized execution components 345A . . . N or any of the execution components 345A . . . N currently undergoing initialization. The next execution component execution components 345A . . . N to initialize, must thus be one which can initialize independently in the context of the already-initialized execution components 345A . . . N.

The initialization plugin 360 initializes this next-identified execution component execution components 345A . . . N and similarly for the remaining execution components 345A . . . N until the application is fully initialized or otherwise ready to begin execution. In some examples, the generated dependency graph is converted into a series of parallelizable tasks that can submitted to the thread pool abstraction in a predetermined order. In that case, the example sequence just described takes place before the initialization plugin 360 has commenced initialization.

Turning next to FIG. 4, FIG. 4 is an illustration of a directed acyclic graph (DAG) 400 similar to one that may be generated by dependency graph generator 335. A DAG is a finite directed graph with no directed cycles. a DAG includes of vertices and edges, where each edge has an initial and a terminal vertex. In general, the vertices correspond to execution components 345A . . . N and the edges correspond to dependency relationships. DAGs are a natural fit for program code that lack circular dependencies, which are bugs that can lead to initialization failures or deadlocks.

In DAG 400, execution components 405-455 (referred to as "components" in this section) are shown as ovals and dependencies 410-480 are shown as directed arrows. The direction of a directed arrow indicates the direction of the dependency. For instance, dependency 410 between component 405 and 415 indicates that component 415 depends on component 405. Thus, for example, component 405 has 4 components 415-445 that depend directly on it. DAG 400 also illustrates indirect dependencies. For instance, component 445 depends directly on component 435 as shown by dependency 470. Component 435, in turn, depends on component 405. Component 445 thus indirectly depends on component 405.

As described in FIG. 3 and the accompanying description, an initialization plugin 360 or other application framework 325 mechanism can determine, using the DAG, a subset of the components 405-455 that do not depend on any other component. In this example, only 1 component, component 405, has no other dependencies. The initialization plugin 360 can initialize component 405 first or otherwise add component 405 to an initialization ordering to cause it to be initialized first. And while this example has only one topline component, other examples may include any number of topline components. Further, in some cases, all components may be topline components, where no component depends on any other component.

Once component 405 has completed initialization, components 415 and 425 may be initialized in parallel as their only dependency is on component 405. Component 435 depends on both components 415 and 425 and thus cannot be initialized until they have completed initialization. Likewise, while component 435 depends directly on component 405 at dependency 430, it also depends directly on component 425 at dependency 440. This illustrates multiple direct dependencies, each of which must be satisfied before initialization can begin.

Once component 415 has completed initialization, component 435 still cannot begin initialization until component 425 has completed. One the other hand, if component 425 completes first, component 435 again cannot begin initialization until component 415 has completed. Once both components 415 and 425 have completed initialization, component 435 can begin initialization. Components 435 and 445 cannot be initialized in parallel because component 445 depends on component 435 via dependency 470. Components 445 and 455 can be initialized in parallel once component 435 has completed initialization, since component 455 depends solely on component 435 and component 445 depends on components 405, 425, and 435, each of which must have completed its initialization if 435 has completed its initialization.

DAG 400 illustrates a simple dependency relationship among several execution components 405-455 and some of their relationships and initialization ordering are discussed. However, one of ordinary skill in the art will immediately recognize that a large variety of complex dependency relationships may exist in a typical software module and that DAG 400 merely serves to help illustrate certain non-limiting concepts.

Figure 5:
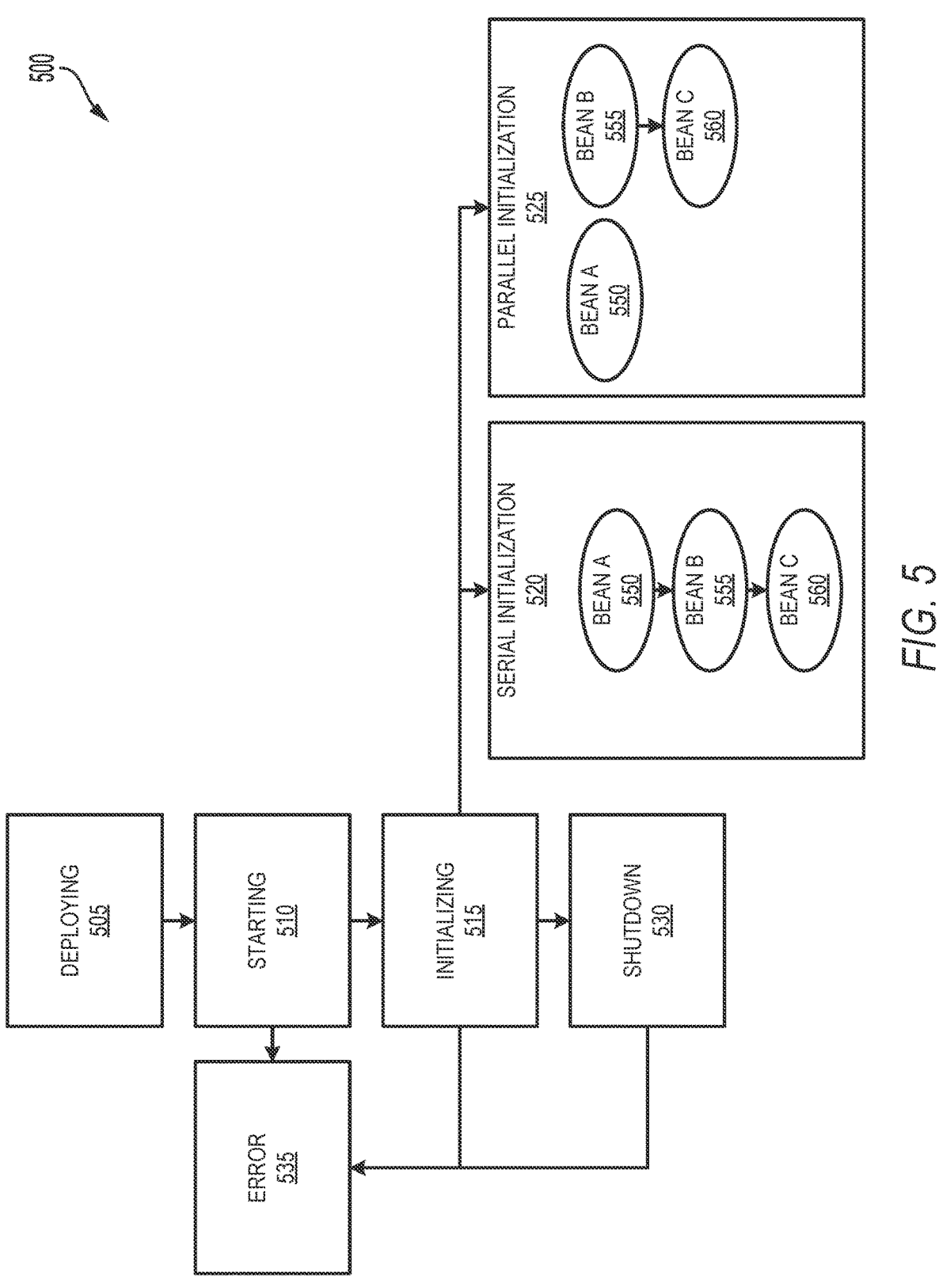
FIG. 5 is an illustration of an example application lifecycle used in some systems for parallel component initialization using static dependency analysis, according to some aspects of the present disclosure.

Turning next to FIG. 5, FIG. 5 is an illustration of an example application lifecycle 500 both with and without parallel component initialization using static dependency analysis. An application framework 325, such as the Spring framework, may have a well-defined lifecycle. Application developers can use various standard APIs that are exposed throughout the lifecycle to accomplish design objectives. For instance, certain lifecycle phases may expose callback methods that can be used to perform certain actions at specific times during the application lifecycle.

Lifecycle 500 includes a deploying phase 505. In deploying phase 505, the core application framework 325 components may be loaded along with the execution components 345A . . . N contributed by the application developer. For example, the core components and the execution components 345A . . . N may be loaded from disk storage into a memory device. The components may undergo operations such as decompression, unarchiving, formatting, sorting, and so on, in preparation for execution.

Lifecycle 500 includes a starting phase 510 during which the core components and the execution components 345A . . . N are started at the application level of abstraction. Startup of the core components is handled by the application framework 325. During initialization phase 515, the initialization of the individual components is managed. In some examples, initialization phase 515 is performed by an extensible API that can be customized or modified using, for example, an initialization plugin 360.

In a typical application framework 325, the processes of the initialization phase 515 may be configured to initialize execution components 345A . . . N serially as shown in serial initialization 520. In serial initialization 520 (and parallel initialization 525) execution components 345A . . . N are depicted as "beans," an example of execution components 345A . . . N as may be designed for the Spring framework using the Java programming language. For example, a top-level component such as bean 550 may be identified, followed by a bean 555 that has at most a dependency on bean 550, followed by bean 560 that has at most a dependency on beans 550 or 555, and so on. In this example, only one execution component is initialized at a time and processing resources may be lying dormant.

In contrast, in parallel initialization 525, initialization plugin 360 receives a dependency graph such as DAG 400 of FIG. 4, to identify top-level beans 550 and 555 to initialize in parallel. Once bean 555 has completed initialization, bean 560, which depends only on bean 555, can be initialized, even if bean 550 is still initializing. Parallel initialization 525 may include a number of execution components 345A . . . N initializing in parallel limited by system resources such as heap memory and available threads.

Lifecycle 500 includes a shutdown phase 530 that may include methods and callbacks that are executed upon the application receiving an indication to stop execution. For instance, such methods may purge memory of unneeded data or remove temporary files. Lifecycle 500 includes an error handling phase 535 that may be referenced by resources in other lifecycle phases such as starting phase 510, initialization phase 515, and shutdown phase 530.

Referring now to FIG. 6, FIG. 6 shows a flowchart of an example method 600 implementing parallel component initialization using static dependency analysis. The description of the method 600 in FIG. 6 will be made with reference to FIGS. 3-5, however any suitable system according to this disclosure may be used, such as the example systems 100 and 200, shown in FIGS. 1 and 2.

It should be appreciated that method 600 provides a particular method for implementing parallel component initialization using static dependency analysis. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. For example, the description is given from the perspective of a computing device such as the application server 320 but other configurations are possible such as that of a standalone development environment with remote access to the application server 320. One of ordinary skill in the art would recognize many variations, modifications, and alternatives.

At block 602, the computing device receives a set of program code comprising one or more execution components 345A . . . N. For example, in a typical scenario, an application framework 325 such as the Spring framework may include various core dependencies and application developers author execution components 345A . . . N that extend the core functionality of the application framework 325 using APIs provided by the application framework 325. Such a collection of execution components 345A . . . N may be referred to collectively as an application.

The set of program code may be a collection of source code files, in which each or some subset of the source code files constitute an execution component 345A . . . N. An execution component 345A . . . N may be, for instance, a Java source code file and an extensible markup language (XML) configuration file that are, together, a Spring bean or JavaBean. In another example, execution component 345A . . . N may be a combination of a JavaScript file and a JavaScript Object Notation (JSON) object in a file that together constitute a Node.js module. Other files or combinations of files may be examples of execution components 345A . . . N.

In some examples, the set of program code may be compiled source code. For instance, the set of program code may be a collection of files containing Java bytecode, configuration files, compiled source code files from other languages, graphical or audio assets, and so on. In some examples, the set of program code may be received by way of an automated build tool configured to use a particular extension for parallel initialization. For instance, build tools such as Maven, Gradle, npm, pip, gem, cargo, and so on may be used to identify the files that are execution components 345A . . . N. The build tools may include configuration files that manually designate or otherwise configure the execution components 345A . . . N.

At block 604, the computing device generates a dependency graph of the execution components 345A . . . N based on a static analysis of the set of program code. For example, a standalone static analysis tool can receive as input the set of program code to perform various static analyses. The static analysis tool can, for instance, generate a dependency graph, such as a directed acyclic graph (DAG) execution components 345A . . . N, as illustrated in FIG. 4 and the accompanying description. In some examples, the static analysis tool may be incorporated into the automated built tool by way of an extension framework as discussed with respect to the static analysis plugin 330. For instance, a typical static analysis tool that may be used in concert with the Java programming language is Soot. Other popular examples include Clang for C/C++, PyLint for Python, ESLint for JavaScript, and SonarQube for multiple languages including Java, C#, and JavaScript.

At block 606, the computing device determines, from the dependency graph, a first subset of the one or more execution components that do not depend on any other execution component of the one or more execution components. For example, the initialization plugin 360 may receive a DAG generated by the dependency graph generator 335, as described in FIG. 3 and the accompanying description. The DAG may be sent to the initialization plugin 360 in various suitable machine-readable formats such as a Graphviz file, Graph Exchange XML Format, GraphML, Graph Modelling Language, and so on. The DAG may also be described semantically using a structured or semi-structured data format such as plain text, XML, or JSON.

In some examples, the computing device may receive one or more modifications to the configured thread pool. The modifications may be, for example, modifications manually made by an application developer to adapt the system 300 to operational parameters or other design considerations. In this case, the thread pool may be based on the modifications. For example, upon generation of the dependency graph, an application developer may review the graph and determine that certain manual adjustments should be made. For instance, while several top-level execution components 345A . . . N may be identified, due to resource constraints, the application developer may elect to allow only certain execution components 345A . . . N to initialize before others, even if they could initialize in parallel. The dependency graph may be modified by hand or using a suitable tool to ensure that the initialization plugin 360 adheres to the initialization ordering determined by the application developer.

At block 608, the computing device configures an initialization thread pool to initialize in parallel a plurality of the first subset of the one or more execution components 345A . . . N. For example, the initialization plugin 360 may use the generated DAG to determine that 3 top-level execution components 345A . . . N can be started in parallel. A particular application server 320 executing an application framework 325 may have a thread pool for initializing the application available that includes 5 threads based on hardware and resource constraints, current load, and so on. In this example, only 3 of the 5 available threads may be used to initialize the 3 top-level execution components 345A . . . N in parallel. In addition to a thread pool, other abstractions that can be used for starting multi-threaded tasks include executors, executor services, futures, parallel streams, Fork-Join pools, manually generated thread abstractions (e.g., the Java thread class), and so on.

At block 610, the computing device, responsive to a first execution component 345A . . . N of the first subset of the one or more execution components 345A . . . N completing initialization, determines, from the dependency graph, a second execution component 345A . . . N that depends on the first execution component 345A . . . N and does not depend on any other uninitialized execution components 345A . . . N of the one or more execution components 345A . . . N or any of the first subset of the one or more execution components 345A . . . N initializing. Thus, the initialization plugin 360 is configured to identify a next execution component 345A . . . N that can be started in parallel. In some examples, where multiple such execution components 345A . . . N are identified, the initialization plugin 360 may include an algorithm for resolving which execution component 345A . . . N should be started next, such as Depth-First Search (DFS) or Breadth-First Search (BFS) graph search algorithms. In some examples, the initialization ordering of execution components 345A . . . N with identical dependency trees may be manually configured by the application developer.

At block 612, the computing device configures the initialization thread pool to initialize the second execution component 345A . . . N. In some examples, initialization may proceed according to the dependency graph making maximal use of all available threads. However, the initialization plugin 360 may include configurations such as limiting the number of threads used for initialization to constrain the resource used by the initialization lifecycle phase 515.

In some examples, the application including execution components 345A . . . N may be restarted. For example, the application may receive a restart signal and enter the shutdown phase 530 as shown in FIG. 5 and the accompanying description. Upon restarting, the application may reuse the DAG previously determined by the static analysis plugin 330. In these examples, it is not necessary to recalculate the dependency graph for each startup/shutdown cycle of the application.

Figure 7:
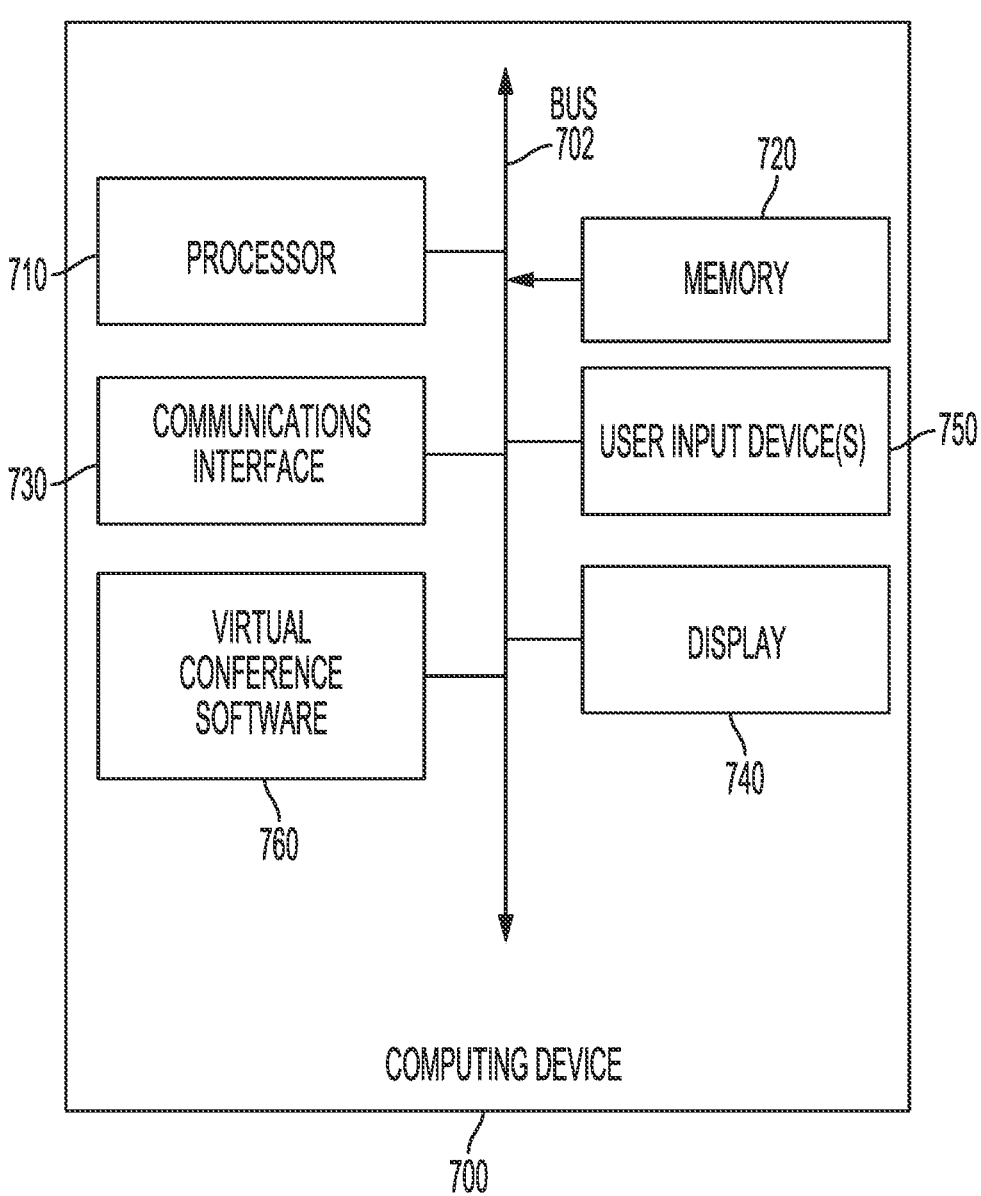
FIG. 7 shows an example computing device suitable for use in example systems or methods for parallel component initialization using static dependency analysis according to this disclosure.

Referring now to FIG. 7, FIG. 7 shows an example computing device 700 suitable for use in example systems or methods for providing parallel component initialization using static dependency analysis according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for parallel component initialization using static dependency analysis according to different examples, such as part or all of the example method 600 described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes virtual conferencing software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving a set of program code comprising one or more execution components; generating a dependency graph of the execution components based on a static analysis of the set of program code; determining, from the dependency graph, a first subset of the one or more execution components that do not depend on any other execution component of the one or more execution components; configuring an initialization thread pool to initialize in parallel a plurality of the first subset of the one or more execution components; responsive to a first execution component of the first subset of the one or more execution components completing initialization, determining, from the dependency graph, a second execution component that: depends on the first execution component; and does not depend on: any other uninitialized execution components of the one or more execution components; or any of the first subset of the one or more execution components initializing; and configuring the initialization thread pool to initialize the second execution component.

Example 2 is the method of example(s) 1, wherein the dependency graph is a directed acyclic graph.

Example 3 is the method of example(s) 1, wherein the dependency graph includes one or more dependencies among the one or more execution components, wherein a dependency comprises: an element defined in a provider execution component; and an interface to the element used in a dependent execution component.

Example 4 is the method of example(s) 1, further comprising receiving an indication from a build automation tool to parallelize initialization of the one or more execution components.

Example 5 is the method of example(s) 4, wherein the indication from the build automation tool to parallelize the initialization is generated by a build automation tool plugin.

Example 6 is the method of example(s) 1, further comprising: receiving an indication to start an application comprising a second subset of the one or more execution components; responsive to the indication to start the application, generating the initialization thread pool based on the configured initialization thread pool; and initializing the second subset of the one or more execution components in parallel.

Example 7 is the method of example(s) 6, wherein the application includes one or more components of a video conferencing platform.

Example 8 is the method of example(s) 6, further comprising restarting the application comprising the second subset of the one or more execution components using the configured initialization thread pool.

Example 9 is the method of example(s) 6, further comprising receiving one or more modifications to the configured initialization thread pool, wherein the generated initialization thread pool is based on the modified configured initialization thread pool.

Example 10 is the method of example(s) 6, wherein the application is based on an application development framework, comprising a plugin for parallelizing execution component initialization.

11. A non-transitory computer-readable medium storing instructions that, when executed by one or more processors, cause the one or more processors to perform operations including: receiving a set of program code comprising one or more execution components; generating a dependency graph of the execution components based on a static analysis of the set of program code; determining, from the dependency graph, a first subset of the one or more execution components that do not depend on any other execution component of the one or more execution components; determining an execution component initialization order to initialize in parallel a plurality of the first subset of the one or more execution components; for each execution component of the plurality of the first subset of the one or more execution components, based on the execution component initialization order: generating a thread; and initializing an execution component; responsive to a first execution component of the first subset of the one or more execution components completing initialization, determining, from the dependency graph, a second execution component that: depends on the first execution component; and does not depend on: any other uninitialized execution components of the one or more execution components; or any of the first subset of the one or more execution components initializing; creating a new thread; and initializing the second execution component.

Example 12 is the non-transitory computer-readable medium of example(s) 11, wherein the dependency graph is a directed acyclic graph.

Example 13 is the non-transitory computer-readable medium of example(s) 11, further comprising receiving an indication from a build automation tool to parallelize initialization of the one or more execution components, wherein the indication from the build automation tool to parallelize the initialization is generated by a build automation tool plugin.

Example 14 is the non-transitory computer-readable medium of example(s) 11, further comprising the operations: starting an application comprising a second subset of the one or more execution components, wherein: the application includes one or more components of a video conferencing platform; and the application is based on an application development framework, comprising a plugin for parallelizing execution component initialization.

Example 15 is the non-transitory computer-readable medium of example(s) 11, further comprising the operations: receiving one or more modifications to the execution component initialization order; and for each execution component of the plurality of the first subset of the one or more execution components, based on the modified execution component initialization order: generating a thread; and initializing an execution component.

Example 16 is a system comprising: one or more processors; and one or more computer-readable storage media storing instructions which, when executed by the one or more processors, cause the one or more processors to perform operations including: receiving a set of program code comprising one or more execution components; generating a dependency graph of the execution components based on a static analysis of the set of program code; determining, from the dependency graph, a first subset of the one or more execution components that do not depend on any other execution component of the one or more execution components; generating an executor service configured to initialize in parallel a plurality of the first subset of the one or more execution components; for each execution component of the plurality of the first subset of the one or more execution components: submitting the execution component to the executor service for initialization on a new thread; and receiving a callback corresponding to the initialization of the execution component; responsive to an execution of a callback corresponding to the initialization of a first execution component of the first subset of the one or more execution components, determining, from the dependency graph, a second execution component that: depends on the first execution component; and does not depend on: any other uninitialized execution components of the one or more execution components; or any of the first subset of the one or more execution components initializing; submitting the second execution component to the executor service for initialization on a new thread; receiving a callback corresponding to the initialization of the second execution component; and detecting an execution of the callback corresponding to the initialization of the second execution component.

Example 17 is the system of example(s) 16, wherein the dependency graph is a directed acyclic graph.

Example 18 is the system of example(s) 16, further comprising receiving an indication from a build automation tool to parallelize initialization of the one or more execution components, wherein the indication from the build automation tool to parallelize the initialization is generated by a build automation tool plugin.

Example 19 is the system of example(s) 16, further comprising the operations: starting an application comprising a second subset of the one or more execution components, wherein: the application includes one or more components of a video conferencing platform; and the application is based on an application development framework, comprising a plugin for parallelizing execution component initialization.

Example 20 is the system of example(s) 16, further comprising receiving one or more modifications to the generated executor service, wherein the executor service is reconfigured and restarted based on the modifications to the generated executor service.

That which is claimed is:

1. A method, comprising:
   receiving a set of program code comprising one or more execution components;
   generating a dependency graph of the execution components based on a static analysis of the set of program code;
   determining, from the dependency graph, a first subset of the one or more execution components that do not depend on any other execution component of the one or more execution components;
   configuring an initialization thread pool to initialize in parallel a plurality of the first subset of the one or more execution components;
   responsive to a first execution component of the first subset of the one or more execution components completing initialization, determining, from the dependency graph, a second execution component that:
      depends on the first execution component; and
      does not depend on:
         any other uninitialized execution components of the one or more execution components; or
         any of the first subset of the one or more execution components initializing; and
   configuring the initialization thread pool to initialize the second execution component.

2. The method of claim 1, wherein the dependency graph is a directed acyclic graph.

3. The method of claim 1, wherein the dependency graph includes one or more dependencies among the one or more execution components, wherein a dependency comprises:
   an element defined in a provider execution component; and
   an interface to the element used in a dependent execution component.

4. The method of claim 1, further comprising receiving an indication from a build automation tool to parallelize initialization of the one or more execution components.

5. The method of claim 4, wherein the indication from the build automation tool to parallelize the initialization is generated by a build automation tool plugin.

6. The method of claim 1, further comprising:

receiving an indication to start an application comprising a second subset of the one or more execution components;

responsive to the indication to start the application, generating the initialization thread pool based on the configured initialization thread pool; and initializing the second subset of the one or more execution components in parallel.

7. The method of claim 6, wherein the application includes one or more components of a video conferencing platform.

8. The method of claim 6, further comprising restarting the application comprising the second subset of the one or more execution components using the configured initialization thread pool.

9. The method of claim 6, further comprising receiving one or more modifications to the configured initialization thread pool, wherein the generated initialization thread pool is based on the modified configured initialization thread pool.

10. The method of claim 6, wherein the application is based on an application development framework, comprising a plugin for parallelizing execution component initialization.

11. A non-transitory computer-readable medium storing instructions that, when executed by one or more processors, cause the one or more processors to perform operations including:

receiving a set of program code comprising one or more execution components;

generating a dependency graph of the execution components based on a static analysis of the set of program code;

determining, from the dependency graph, a first subset of the one or more execution components that do not depend on any other execution component of the one or more execution components;

determining an execution component initialization order to initialize in parallel a plurality of the first subset of the one or more execution components;

for each execution component of the plurality of the first subset of the one or more execution components, based on the execution component initialization order:

generating a first thread; and initializing an execution component;

responsive to a first execution component of the first subset of the one or more execution components completing initialization, determining, from the dependency graph, a second execution component that:

depends on the first execution component; and does not depend on:

any other uninitialized execution components of the one or more execution components; or any of the first subset of the one or more execution components initializing;

creating a new thread; and initializing the second execution component.

12. The non-transitory computer-readable medium of claim 11, wherein the dependency graph is a directed acyclic graph.

13. The non-transitory computer-readable medium of claim 11, further comprising receiving an indication from a build automation tool to parallelize initialization of the one or more execution components, wherein the indication from the build automation tool to parallelize the initialization is generated by a build automation tool plugin.

14. The non-transitory computer-readable medium of claim 11, further comprising the operations:

starting an application comprising a second subset of the one or more execution components, wherein:

the application includes one or more components of a video conferencing platform; and the application is based on an application development framework, comprising a plugin for parallelizing execution component initialization.

15. The non-transitory computer-readable medium of claim 11, further comprising the operations:

receiving one or more modifications to the execution component initialization order; and for each execution component of the plurality of the first subset of the one or more execution components, based on the modified execution component initialization order:

generating a second thread; and initializing an execution component.

16. A system comprising:

one or more processors; and one or more computer-readable storage media storing instructions which, when executed by the one or more processors, cause the one or more processors to perform operations including:

receiving a set of program code comprising one or more execution components;

generating a dependency graph of the execution components based on a static analysis of the set of program code;

determining, from the dependency graph, a first subset of the one or more execution components that do not depend on any other execution component of the one or more execution components;

generating an executor service configured to initialize in parallel a plurality of the first subset of the one or more execution components;

for each execution component of the plurality of the first subset of the one or more execution components:

submitting the execution component to the executor service for initialization on a first new thread; and receiving a callback corresponding to the initialization of the execution component;

responsive to a first execution of a callback corresponding to the initialization of a first execution component of the first subset of the one or more execution components, determining, from the dependency graph, a second execution component that:

depends on the first execution component; and does not depend on:

any other uninitialized execution components of the one or more execution components; or any of the first subset of the one or more execution components initializing;

submitting the second execution component to the executor service for initialization on a second new thread;

receiving a callback corresponding to the initialization of the second execution component; and detecting a second execution of the callback corresponding to the initialization of the second execution component.

17. The system of claim 16, wherein the dependency graph is a directed acyclic graph.

18. The system of claim 16, further comprising receiving an indication from a build automation tool to parallelize initialization of the one or more execution components, wherein the indication from the build automation tool to parallelize the initialization is generated by a build automation tool plugin.

19. The system of claim 16, further comprising the operations:

starting an application comprising a second subset of the one or more execution components, wherein:

the application includes one or more components of a video conferencing platform; and the application is based on an application development framework, comprising a plugin for parallelizing execution component initialization.

20. The system of claim 16, further comprising receiving one or more modifications to the generated executor service, wherein the executor service is reconfigured and restarted based on the modifications to the generated executor service.

\* \* \* \* \*